United States Patent [19]
Noguchi et al.

[11] 3,997,264
[45] Dec. 14, 1976

[54] ENLARGING LENS BARREL

[75] Inventors: Yoshiro Noguchi, Sakai; Yukio Maekawa, Osaka, both of Japan

[73] Assignee: Minolta Camera Kabushiki Kaisha, Osaka, Japan

[22] Filed: July 16, 1975

[21] Appl. No.: 596,341

Related U.S. Application Data

[63] Continuation of Ser. No. 467,987, May 8, 1974, abandoned.

[30] Foreign Application Priority Data

May 14, 1973 Japan .............................. 48-57141
May 14, 1973 Japan .............................. 58-57142

[52] U.S. Cl. ................................. 355/61; 354/198
[51] Int. Cl.² ......................................... G03B 27/52
[58] Field of Search .................. 355/61–63; 354/198

[56] References Cited
UNITED STATES PATENTS

| | | | |
|---|---|---|---|
| 2,504,254 | 4/1950 | De Grave, Jr. ................. | 355/61 X |
| 2,985,067 | 5/1961 | Hauptvogel et al. ............ | 355/62 X |

FOREIGN PATENTS OR APPLICATIONS 1,111,935   5/1968   United Kingdom .............. 354/198

*Primary Examiner*—Richard A. Wintercorn
*Attorney, Agent, or Firm*—Wolder & Gross

[57] ABSTRACT

An enlarger lens barrel has a cavity provided with an outwardly directed window and a longitudinal bore defining a light passageway between the cavity and the enlarger light source. A diaphragm aperture adjusting ring is rotatable on the barrel and carries a transparent indicator ring provided with aperture designating characters which are movable with the indicator ring across the window. Housed in the cavity is a transparent light guide member having a cylindrically concave radially extending face confronting the bore and a transversely ribbed inside face including longitudinally and slightly radially spaced transverse faces reflecting light incident thereon from the passageway to the window to longitudinally spread the light incident thereon which is transversely diverged by the concave face. The rings are longitudinally shiftable between increment and continuous adjustment positions.

18 Claims, 6 Drawing Figures

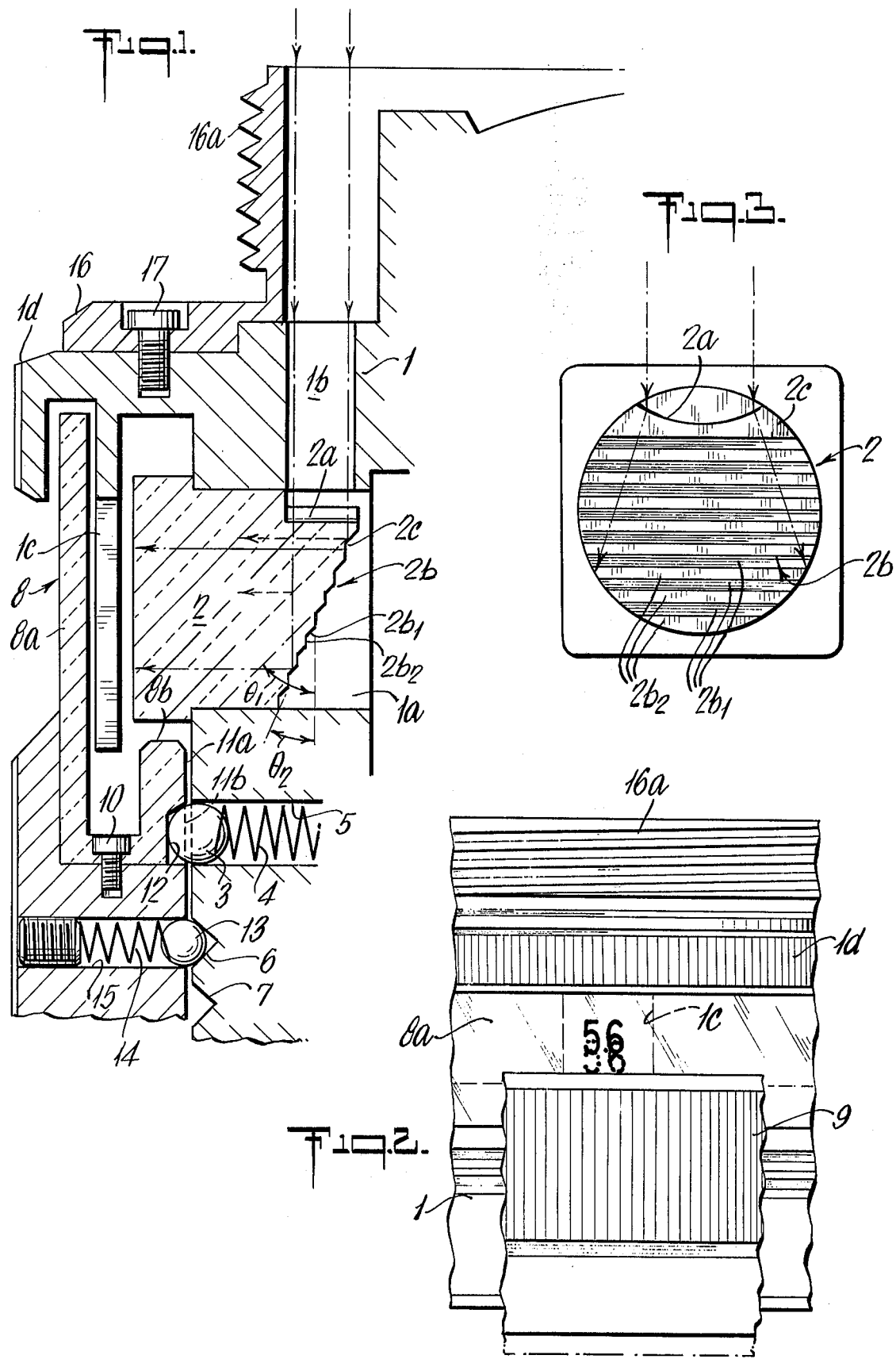

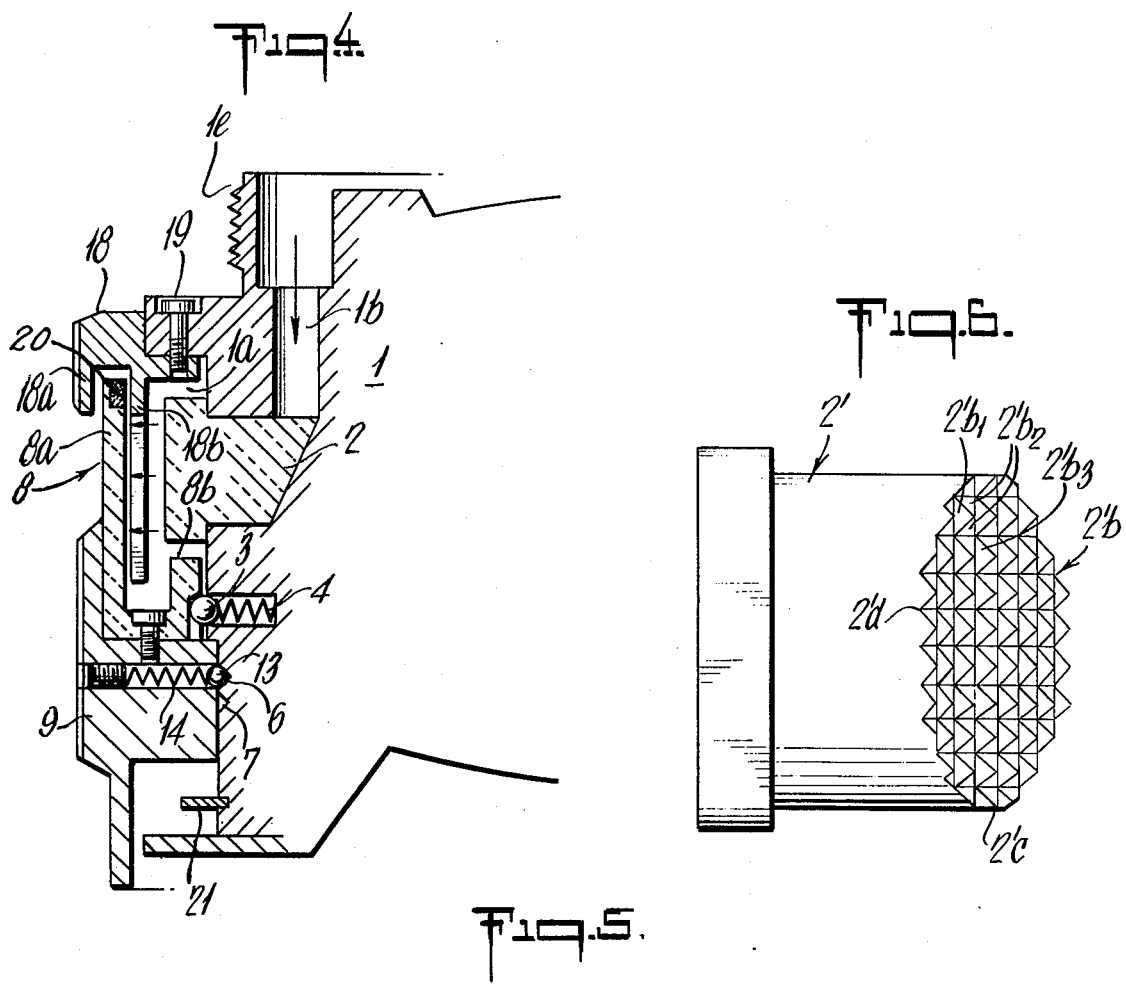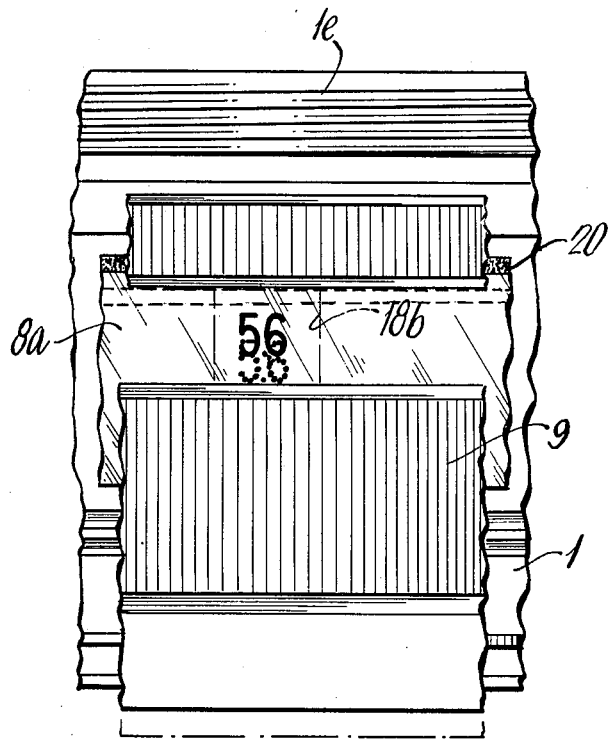

ENLARGING LENS BARREL

This is a continuation, of Application Ser. No. 467,987, filed May 8, 1974, now abandoned.

BACKGROUND OF THE INVENTION

The present invention relates generally to an enlarging lens barrel, and it relates more particularly to an improved enlarging lens barrel for use which, when mounted on an enlarger, characters or figures representing the aperture value of the lens iris diaphragm are illuminated by the light from a light source of the enlarger.

When a positive print is produced with the use of an enlarger, it would be highly advantageous, if the aperture value of the enlarging lens is visible in a dark room. In this connection, there is described in the German laid-open Patent Application No. 1924016 an enlarging lens barrel, comprising an inner sleeve having an opening in a given circumferential position and a guide passage adapted to guide the light from the enlarger light source into an opening; a single reflecting surface adapted to reflect the light traversing the guide passage in a radially outward direction, a transparent light guide having an outer peripheral surface on which are marked a series of characters representing aperture values; and a diaphragm setting ring adapted to rotate along the outer circumferential surface of the inner sleeve and having an observation window in a portion thereof in front of the opening.

With this enlarging lens barrel, the light from a light source of the enlarger traverses the guide passageway and is reflected by the single reflecting surface of the light guide, thereby illuminating a series of characters representing aperture values. When the aperture of the iris diaphragm is varied by rotating the diaphragm setting ring, then there can be observed through the observation window only the characters representing the aperture value corresponding to the aperture of the iris diaphragm which has been set at that time.

However, this enlarging lens barrel possesses numerous disadvantages, among which is the limitation imposed on the outer diameter of the coupling portion to the enlarger, since the inner diameter of the enlarging lens coupling portion is predetermined or fixed, and in that there is a limitation imposed on the outer diameter of the lens holder, because the diameter of the lens is predetermined or fixed, such that the aforesaid guide passageway may not be enlarged in width in a radial direction. Accordingly, the light which traverses this guide passageway and reflected by the aforesaid single reflecting surface in a radially outward direction in narrowed in width to pencil of light rays in the axial direction of the inner sleeve, resulting in the illumination of only a limited region of the aforesaid outer circumferential surface. This then results in the limitation of rendering the respective illuminated characters very small, with the resultant difficulty of reading such characters.

On the other hand, most of enlarging lens barrels commercially available are provided with only a click type or non-continuous type diaphragm setting ring, whereby the aperture of an iris diaphragm may be set in a stepped or increment manner in cooperation with the angular position of the ring. However, this type of enlarging lens barrel involves shortcomings in that when a subject image of a color negative is to be printed on a printing paper in an attempt to obtain a positive print having a good color balance, the aperture of the aforesaid iris diaphragm should be more finely adjusted than that of a unit setting graduation. This type of enlarging lens barrel is not suitable for this purpose for such reason.

To this end, there has been proposed a so-called enlarging lens barrel of the manually preset type, which is provided with a click-type or non-continuous type diaphragm setting ring and with a non-click type or continuous type diaphragm setting ring, whereby when the click-type diaphragm setting ring is set to an aperture value such as 5.6, the non-click type or continuous type diaphragm setting ring may be rotated continuously within a range from the maximum aperture value to 5.6. However, the aforesaid two setting rings of this enlarging lens barrel must be separately manipulated, such that frequent erroneous adjustments result in a dark room.

SUMMARY OF THE INVENTION

It is accordingly a principal object of the present invention to provide an enlarging lens barrel for use in an enlarger, in which characters representing the aperture value corresponding to the iris diaphragm are indicated by being illuminated by the light from the light source of the enlarger for facilitating the reading of the characters.

It is another object of the present invention to provide an enlarging lens barrel, in which the manipulation of a single diaphragm setting ring permits the change in aperture of the iris diaphragm in a continuous manner, thereby rendering the manipulation very easy for use in a dark room.

It is a still further object of the present invention to provide an enlarging lens barrel, in which whether or not the diaphragm setting ring has been set to a position to permit the continuous change in the aperture of the iris diaphragm indicia corresponding to the diaphragm aperture value may be indicated in the light from the light source of the enlarger.

According to the present invention, there is provided an enlarging lens barrel which comprises: an inner sleeve provided with an opening and a guide passageway for guiding the light from a light source into said opening, a light guide fixed within said opening and having a stepped or terraced light-reflecting surface; a diaphragm setting ring adapted to rotate along the outer circumferential surface of the inner sleeve and to set the aperture of the iris diaphragm in accordance with the angular position thereof; and an indicating ring having thereon a series of characters representative of aperture values, said indicating ring being rigidly mounted on said diaphragm setting ring in a manner to cover the front of said opening and made of a transparent material; said stepped or terraced light-reflecting surface consisting of a plurality of alternately side-by-side light-reflecting unit surfaces inclined so as to reflect the light traversing the guide passageway toward the outside of said opening, and a plurality of surfaces substantially in parallel with the advancing direction of the aforesaid light.

Where the enlarging lens barrel is attached to an enlarger, the light from the enlarger light source passes through the guide passageway to be incident on the light guide. Then, the light is reflected by the aforesaid stepped or terraced light-reflecting surfaces. In this respect, the width of a pencil of light rays will be expanded within a plane of incidence in a direction perpendicular to the advancing direction of the reflected light, thereby illuminating said indicating ring over a wide range. As a result, large size characters representing aperture values may be carried by the indicating ring, thereby providing excellent readability of the characters.

The aforesaid advantages of the present device may be further enhanced by providing an optical light diverging member in the front or rear of the light reflecting surface of stepped or terraced shape, or by providing the stepped reflecting surface with other light-reflecting unit surfaces inclined with respect to the intersecting line of the aforesaid light-reflecting unit surfaces with the surfaces which are parallel to the advancing direction of the light.

One feature of the enlarging lens barrel of the present invention, the lens barrel is provided with a click-stop member mounted on the inner sleeve and spring biased against the diaphragm setting ring, the diaphragm setting ring being provided with a circumferential surface having therein a plurality of peripherally spaced grooves corresponding to a series of aperture values and engageable with the click-stop member, and a smooth circumferential surface free of such grooves and adjacent to said circumferential surface but extending in the axial direction of the inner sleeve.

With such an arrangement, the mere movement of the aforesaid diaphragm setting ring in the axial direction of the inner sleeve causes the click-stop member to abut on the aforesaid smooth circumferential surface to directly change the aperture of the iris diaphragm to non-clicking or continuous adjustment mode.

Another feature of the enlarging lens barrel of the present invention resides in the provision of a click-stop release indicating ring which is colored, but transparent, and located at the end portion of the indicating ring along the axial direction of the inner sleeve, with said inner sleeve or a member integral therewith being provided with a cover adapted to cover the click-stop release indicating ring, when the click-stop member is urged or biased under spring influence against the circumferential surface having the grooves therein. When the click-stop member is spring urged against the smooth circumferential surface devoid of the aforesaid grooves therein, the click-stop release indicating ring emerges from said cover and appears in front of the aforesaid opening to be illuminated by the light passing through the aforesaid light guide. Accordingly, an operator need only observe the thus illuminated click-stop release indicating ring to determine whether or not the iris diaphragm is in a condition allowing the non-clicking type adjustment of the aperture thereof.

Other features and advantages of the invention will be apparent from the following description taken in conjunction with the accompanying drawings.

BRIEF DESCRIPTION OF THE DRAWINGS

FIG. 1 is a fragmentary medial longitudinal cross-sectional view showing the essential parts of one embodiment of an enlarging lens barrel embodying the present invention;

FIG. 2 is a front view of the enlarging lens barrel of FIG. 1, showing by phantom line, the barrel in a condition permitting the non-clicking type adjustment of the diaphragm;

FIG. 3 is a rear view of the light guide member of the embodiment shown in FIG. 1;

FIG. 4 is a view similar to FIG. 1 of another embodiment of the present invention;

FIG. 5 is a front view of the enlarging lens barrel of FIG. 4, showing by phantom line, the barrel in a condition permitting the non-clicking type adjustment of the diaphragm; and FIG. 6 is a bottom view of a modification of the light guide shown in FIG. 1.

DESCRIPTION OF THE PREFERRED EMBODIMENTS

Referring now to the drawings, particularly FIGS. 1 to 3 thereof which illustrate a preferred embodiment of the present invention, the reference numeral 1 generally designates an inner sleeve which holds lens groups (not shown) directly or indirectly in a conventional manner, the inner sleeve having an opening 1a at a predetermined position, the peripheral wall thereof, in which opening is housed and fixed a light guide 2. The inner sleeve 1 further includes below the opening 1a, a bore 5 extending in a radial direction and engaging a ball 3 and a compression coil spring 4 constituting part of a first click stop means and two longitudinally spaced annular grooves 6 and 7 constituting part of a second click stop means. Provided above the opening 1a in the inner sleeve 1 are a guide passageway or bore 1b adapted to conduct or guide light from the light source of an enlarger (not shown) into the light guide 2, a frame or window 1c adapted to limit the width of a pencil of light rays from the light guide 2, and a cover wall 1d masking the upper border of the outer ring 8a of an indicating ring 8.

The light guide 2 is made of a transparent material and provided with a concave cylindrical light-incident surface 2a curved about a radial axis in a direction normal to the drawing in FIG. 1, as best shown in FIG. 3, and a terraced or transversely ribbed light-reflecting surface 2b. The terraced light-reflecting surface 2b consists, in alternate side-by-side relation, of light-reflecting unit surfaces $2b_1$ inclined at an angle of $\theta_1(= 45°)$ to the longitudinal axis or advancing direction of the light from the enlarger traversing the guide passageway 1b and surfaces $2b_2$ substantially in parallel with the aforesaid longitudinal axis or advancing direction of the light, whereby the light incident thereon is reflected by the light-reflecting unit surfaces $2b_1$ and deflected through an angle of 90° in a radially outward direction. The terraced light-reflecting surface 2b may be readily prepared by scoring a plurality of parallel V-shaped grooves 2c which extend transversely in a direction normal to the drawing in FIG. 1 on a sloped surface positioned at an angle of $\theta_2$, which is smaller than $\theta_1$, to the advancing direction of the light passing through the guide passageway 1b.

The indicating ring 8 is made of a transparent or semi-transparent material and consists of an outer ring 8a overlying the front of the opening 1a and an inner ring 8b against which the ball 3 is spring biased under the ring being secured by means of a screw 10 to the upper surface of a diaphragm setting ring 9 which is rotatable along the outer circumferential surface of the inner sleeve and to shift in an axial direction of the inner sleeve (in a vertical direction as viewed in the drawing) and which varies or adjusts the aperture of an iris diaphragm (not shown) in accordance with the angular position thereof. In addition, the outer ring 8a has a series of circumferentially spaced characters (for the simplicity of description, only 5.6 is indicated in the drawing) representing aperture values, whereby the characters representing the aperture value corresponding to the iris diaphragm which has been set depending on the angular position of the diaphragm setting ring 9, will register with and be positioned in front of the opening 1a.

On the other hand, the inner circumferential face of the inner ring 8b is formed with a smooth upper circumferential surface 11a and a lower circumferential surface 11b having therein a plurality of circumferentially spaced grooves 12, the grooves corresponding in angular positions to the aforesaid series of characters, said surfaces 11a and 11b being adjacent to each other and extending in the axial direction of te inner sleeve 1, thereby constituting part of the first click stop means. More particularly, when the diaphragm setting ring 9 is moved upwardly as viewed in FIG. 1 and the circumferential surface 11b is brought into engagement with the spring biased ball 3, then the diaphragm setting ring 9 may be rotated in a manner that the ball 3 engages successive grooves in a clicking manner. In contrast thereto, when the diaphragm setting ring 9 is shifted downwardly, with the ball 3 being spring urged against the surface 11a, then the diaphragm setting ring 9 may be uniformly and smoothly rotated, such that the aperture of the iris diaphragm may vary in continuous or non-clicking manner.

The diaphragm setting ring 9 is provided with a radial bore 15 housing a ball 13 and a compression coil spring 14 therein which form part of the second click stop means. The ball 13 is urged by the compression coil spring 14 against the outer circumferential surface of the inner sleeve 1 and is adapted to engage either the annular groove 6 or the groove 7, when the diaphragm setting ring 9 is moved in the longitudinal or axial direction of the inner sleeve 1, thereby indicating to the operator the proper positioning of the ring 9. More specifically, when the diaphragm setting ring 9 is moved to a position where the ball 13 engages the upper annular groove 6, the ball 3 engages the circumferential surface 11b under spring influence. On the other hand, when the ball 13 is moved to a position to engage the lower annular groove 7, the ball 3 abuts the circumferential surface 11a under spring influence.

Shown at 16 is a coupling or attaching member having a screw thread 16a for mounting the enlarging lens sleeve on an enlarger and secured by means of screw 17 to the upper portion of the inner sleeve 1 in a manner not to interfere with the guide passageway 1a.

In preparing a positive print by using the enlarging lens barrel described above, the enlarging lens barrel is attached to the enlarger by means of the screw thread 16a and the light source of the enlarger is energized. Then, part of the light from the enlarger light source traverses or passes through the guide passageway 1b and is incident on the concave light-incident surface 2a, where the light transversely diverges in a plane normal to the drawing in FIG. 1 but in a plane parallel with the drawing in FIG. 3. The light is then reflected by the light reflecting unit surfaces $2b_1$ of the terraced light reflecting surface 2b in a radially outward direction, whereupon the width of a pencil of light rays will be expanded in a vertical direction, i.e., in a plane of incidence but in a direction perpendicular to the advancing direction of the reflected light. The light then passes through the light guide 2, and then through the frame 1c to illuminate substantially a wide area of the outer ring 8a of the indicating ring 8, including the character positioned in front of the opening 1a, that is, the character representing the aperture value corresponding to the aperture of the iris diaphragm which has been set at the time.

The broken line represents the light which is reflected by a single plane, in the case where the reflecting surfaces 2b are provided in the form of a single plane inclined at an angle of $\theta_1$ (=45°) to the advancing direction of the light passing through the guide ball 1b as in the conventional lens barrel. In contrast with the beam represented by this broken line, it is clear that the beam of the reflected light is expanded in width to a much greater extent in the present system. Accordingly, with the present structure, the series of characters may be of large size on the outer ring 8a, thereby providing good readability, even in a dark room.

On the other hand, in the case where the non-clicking or continuous adjustment in the aperture of the iris diaphragm is required, such as in case where a color positive print is prepared from a color negative, an operator may move the diaphragm setting ring 9 from a position shown in FIG. 1 to a position where the ball 13 engages the lower annular groove 7. This causes the spring biased ball 3 to abut the circumferential surface 11a of the inner ring 8b of the indicating ring 8, permitting smooth uniform rotation of the diaphragm setting ring 9. Accordingly, the operator may rotate the diaphragm setting ring 9 slowly to vary the aperture of the iris diaphragm in a continuous or non-clicking manner. This condition is best shown by phantom line in FIG. 2. In this case as well, the light from the light guide is expanded as has been previously described, such that a character representing one of the series of aperture values nearest the aperture value selected at that time or the character representing the aperture value selected at that time is also illuminated in accordance with the angular position of the diaphragm setting ring 9.

FIGS. 4 and 5 show the second embodiment of the present invention, and like reference numerals designate like parts throughout FIGS. 4 and 5. The light incident surface 2a and light reflecting surface 2b of the light guide 2 are shown in a simplified form in FIG. 4, but it should be understood that these are so constructed with a concave surface and a terraced surface, respectively, as in the previous case.

Provided above the opening 1a of the inner sleeve 1 in the present embodiment are a guide passageway or bore 1b adapted to lead and direct light from the light source of the enlarger (not shown) to the light guide 2, and a screw thread 1e for use in attaching the enlarging lens barrel to the body of the enlarger. Shown at 18 is a mounting operation ring adapted to be used by the operator, when mounting the enlarging lens barrel on the enlarger and the ring 18 consists of a depending window or frame 18a for limiting the width of a beam of light from the light guide 2, and a cover 18b adapted to cover the upper portion of the outer ring 8a, said operation ring 18 being secured by means of a screw 19 to the upper portion of the inner sleeve 1.

A click release indicating ring 20 is made of a colored or color coated material which is transparent or semi-transparent, such as celluloid, and is secured to the upper portion of the outer ring 8a. The click release indicating ring 20 is masked by the cover 18b, when the diaphragm setting ring 9 is moved upwardly, as shown in FIG. 4 and thus the balls 3 and 13 are respectively brought into engaging relation with the circumferential surface 11b and annular groove 6, that is, when the aperture of the diaphragm is variable in an increment or clicking manner. On the other hand, the click release indicating ring 20 will emerge from the cover 18b and appear in front of the opening 1a, when the diaphragm setting ring 9 is moved downwardly and the balls 3 and 13 are respectively brought into engagement with the circumferential surface 11a and lower annular groove 7, that is, when the aperture of the iris diaphragm is variable in continuous or non-clicking manner.

Shown at 21 is a stop for limiting the downward extent of movement of the diaphragm setting ring 9, and the stop 21 is secured to the outer circumferential surface of the inner sleeve 1 but in a position below the annular groove 7. As a result, when the diaphragm setting ring 9 is urged to move downwardly beyond the position where the ball 13 engages the circular groove 7, then the diaphragm setting ring 9 abuts the stop 21 on the lower part of the ring 9 and is prevented from further downward movement.

More particularly, in the last embodiment, when the diaphragm setting ring 9 is moved downwardly from a position shown in FIG. 4 and stopped in a position where the ball 13 engages the lower annular groove 7, the ball 3 abuts the circumferential surface 11a under spring influence and the aperture of the iris diaphragm is variable in a continuous or non-clicking manner, and the click release indicating ring 20 is moved downwardly together with the indicating ring 8 as shown by a phantom line in FIG. 5, whereby the click indicating ring 8 will appear in front of the opening 1a.

Accordingly, when the light source of the enlarger is activated, then the light therefrom will pass through the guide passageway 1b, light guide 2 and then through the frame 18b to illuminate the click release indicating ring 19 which has been colored red, as well as the character representing the aperture value at the time, which is located on the outer ring 8a of the indicating ring 8. The operator is thus notified in a dark room that the diaphragm setting ring 9 has been moved to a position where the aperture of the iris diaphragm is variable in continuous or non-clicking manner.

FIG. 6 illustrates a light guide 2' of a modified form. The light guide 2' is provided with; a flat, light-incident surface (not shown) positioned at a right angle to the longitudinal axis or advancing direction of the light traversing the guide passageway 1b, the light guide 2' being fixed within the opening 1a; and a terraced light-reflecting surface 2'b consisting, in alternately side-by-side relation, of a first light-reflecting unit surfaces $2'b_1$ inclined at an angle of 45° to the advancing direction of the light, surfaces $2'b_2$ substantially parallel to the advancing direction of the light and second light-reflecting unit surfaces $2'b_3$ inclined at an small angle to the intersecting line of the both surfaces $2'b_1$ and $2'b_2$ with each other. This terraced reflecting surface 2'b may be readily prepared by scoring or otherwise forming a plurality of parallel V-shaped grooves 2'c in a vertical direction as viewed in FIG. 6, in the sloped surface placed at an angle smaller than 45° to the aforesaid advancing direction of the light and a plurality of parallel V-shaped grooves 2'd in a direction perpendicular to those of V-shaped grooves 2'c.

With the light guide 2' being fixed within the opening 1a, the light traversing the guide passageway 1b advances linearly through the flat light-incident surface to the terraced light reflecting surface 2'b, wherein a greater part of the light is reflected by the first light reflecting unit surface $2'b_1$, while the remaining part thereof is reflected by the second light reflecting unit surface $2'b_3$. In other words, the aforesaid light, upon reflection by those surfaces, will be expanded in a plane perpendicular to the drawing in FIG. 6 and in a vertical direction, thereby illuminating a wide range of the outer ring 8a of the indicating ring 8.

While there have been described preferred embodiments of the present invention, various modifications may be anticipated to those skilled in the art without departing from the spirit and the scope of the claims which follows. For instance, the concave light incident surface 2a of the light guide 2 need not necessarily be provided, or the surface of the light guide 2, from which the light is radiated may be of a concave shape. The light guides 2, 2' need not necessarily be of a transparent material, but may be reflecting mirrors having reflecting surfaces of a terraced type.

We claim:
1. An enlarging lens barrel including an adjustable aperture diaphragm for use in an enlarger having a light source comprising:
    an inner sleeve having an opening at a predetermined circumferential position thereof and a small guide passageway adapted to guide light from the enlarger light source toward said opening;
    a light guide disposed within said opening and having a terraced reflecting surface including alternate side-by-side first light reflecting unit surfaces inclined in a manner to reflect the light traversing said guide passageway toward the outside of said opening and second surfaces substantially parallel with the advancing direction of the light traversing said guide passageway, said first light reflecting unit surfaces having a combined overall length greater than the width of said guide passageway;
    a diaphragm setting ring rotatable along the outer circumferential surface of said inner sleeve and coupled to determine the aperture of the said diaphragm in accordance with the angular position of said setting ring; and
    an indicating ring at least part of which is light transmissive and provided with a series of characters representing aperture values, said indicating ring being mounted on said diaphragm setting ring and positioned in front of said opening to exhibit the character of said series of characters which represents the aperture value corresponding to the respective adjusted aperture of said diaphragm.

2. An enlarging lens barrel as set forth in claim 1, wherein said barrel further comprises an optical member for diverging the light which is directed through said guide passageway toward said terraced reflecting surface.

3. An enlarging lens barrel as set forth in claim 1, wherein said barrel further comprises an optical member for diverging the light which advances toward said indicating ring after being reflected by said terraced light reflecting surface.

4. An enlarging lens barrel as set forth in claim 1, wherein said guide is provided with another group of light reflecting unit surfaces inclined to the intersecting line of said first unit reflecting surfaces with said surfaces substantially in parallel with the advancing direction of the light passing through said guide passageway.

5. An enlarging lens barrel as set forth in claim 2, wherein said diaphragm setting ring is movable in the axial direction of said inner sleeve along the outer circumferential surface of said inner sleeve and wherein said barrel further comprises:

a first click stop member urged against said diaphragm setting ring;
a first circumferential surface provided on said diaphragm setting ring and having a plurality of circumferentially spaced grooves engageable with said first click stop member and corresponding to said series of characters; and
a second, smooth circumferential surface positioned adjacent to said first circumferential surface in the axial direction of said inner sleeve.

6. An enlarging lens barrel as set forth in claim 2, wherein said diaphragm setting ring includes an integral member and is movable along the outer circumferential surface of said inner sleeve in an axial direction thereof and wherein said barrel further comprises:
a first click stop member urged against said integral member;
a first circumferential surface provided on said integral member and having a plurality of circumferentially spaced grooves engageable with said first click stop member said grooves corresponding to said series of characters; and
a second, smooth circumferential surface provided on said integral member adjacent to said first circumferential surface in an axial direction of said inner sleeve.

7. An enlarging lens barrel as set forth in claim 2, wherein said diaphragm setting ring is movable along the outer circumferential surface of said inner sleeve in the axial direction thereof and wherein said barrel further comprises:
a first click stop member provided on said diaphragm setting ring and urged against said inner sleeve;
a first circumferential surface provided on said inner sleeve and having a plurality of circumferentially spaced grooves engageable with said first click stop member, said grooves corresponding to said series of characters;
a second smooth circumferential surface provided on said inner sleeve and adjacent to said first circumferential surface in the axial direction of said inner sleeve.

8. An enlarging lens barrel as set forth in claim 2, wherein said diaphragm setting ring includes an integral member and is movable along the outer circumferential surface of said inner sleeve and wherein said barrel further comprises:
a first click stop member provided on said integral member and urged against said inner sleeve;
a first circumferential surface provided on said inner sleeve and having a plurality of circumferentially spaced grooves engageable with said first click stop member, said grooves corresponding to said series of characters; and
a second circumferential surface provided said inner sleeve and adjacent to said first circumferential surface in an axial direction of said inner sleeve.

9. An enlarging lens sleeve as set forth in claim 6, wherein said barrel further comprises:
a cover provided on said inner sleeve;
a colored, light transmissive, click stop release indicating ring, mounted on the end portion of said indicating ring in an axial direction of said inner sleeve, said click stop release indicating ring being masked by said cover when said click stop member is urged against said first circumferential surface and being unmasked by said cover and appearing in front of said opening, when said click stop member is urged against said second circumferential surface.

10. An enlarging lens barrel as set forth in claim 6, wherein said barrel further comprises:
a cover provided on said member integral with said inner barrel;
a colored, light transmissive, click stop release indicating ring, and mounted on the end portion of said indicating ring in an axial direction of said inner sleeve, said click stop release indicating ring being masked by said cover, when said click stop member is urged against said first circumferential surface and being unmasked by said cover and appearing in front of said opening, when said click stop member is urged against said second circumferential surface.

11. An enlarging lens barrel as set forth in claim 6, wherein said barrel further comprises:
a second click stop member provided on said diaphragm setting ring and urged against said inner sleeve;
a first annular groove provided in said inner sleeve and engageable with said second click stop member, said first click stop member abutting said first circumferential surface when said second click stop member engages said first annular groove;
a second annular groove provided on said inner sleeve and adjacent to said first annular groove and engageable with said second click stop member, said first click stop abutting said second circumferential surface when said second click stop member engages said second annular groove.

12. A lens device having an adjustable diaphragm for use in an enlarger including a light source comprising a tubular barrel mountable on said enlarger and carrying a lens system, said barrel having formed in the wall thereof a cavity provided with an outwardly facing window and a longitudinal light conducting passageway providing light communication between said cavity and said light source, optical means disposed in said cavity for deflecting light from said light source traversing said passageway and incident on said optical means radially, outwardly, through said window and expanding the cross sectional area of said light as it travels from said passageway toward said window, said optical means comprising a serrated reflector located in the path of light traversing said passageway and including longitudinally spaced transversely extending reflecting faces reflecting light incident thereon from said passageway toward said window, said reflecting faces interdigitating faces substantially parallel to the direction of the light traversing said passageway, a diaphragm aperture adjusting ring rotatably supported by said barrel and coupled to said diaphragm, and a light transmissive indicator ring rotatable with said diaphragm ring and carrying circumferentially spaced indicia which traverse a path registering with said window with the rotation of said rings.

13. The lens device of claim 12 including a cylindrically concave refracting lens section having a radially extending longitudinal axis disposed between said passageway and said reflector.

14. An enlarging lens barrel as set forth in claim 1, wherein said diaphragm setting ring is movable along the outer circumferential surface of said inner sleeve in the axial direction thereof and wherein said barrel further comprises:
a first click stop member provided on said diaphragm setting ring and urged against said inner sleeve;

a first circumferential surface provided on said inner sleeve and having a plurality of circumferentially spaced grooves engageable with said first click stop member, said grooves corresponding to said series of characters;

a second smooth circumferential surface provided on said inner sleeve and adjacent to said first circumferential surface in the axial direction of said inner sleeve.

15. An enlarging lens barrel as set forth in claim 1, wherein said diaphragm setting ring is movable along the outer circumferential surface of said inner sleeve in the axial direction thereof and wherein said barrel further comprises:

a first click stop member provided on said diaphragm setting ring and urged against said inner sleeve;

a first circumferential surface provided on said inner sleeve and having a plurality of circumferentially spaced grooves engageable with said first click stop member, said grooves corresponding to said series of characters;

a second smooth circumferential surface provided on said inner sleeve and adjacent to said first circumferential surface in the axial direction of said inner sleeve.

16. An enlarging lens barrel as set forth in claim 15, wherein said barrel further comprises:

a cover provided on said inner barrel;

a colored, light transmissive, click stop release indicating ring, and mounted on the end portion of said indicating ring in an axial direction of said inner sleeve, said click stop release indicating ring being masked by said cover, when said click stop member is urged against said first circumferential surface and being unmasked by said cover and appearing in front of said opening, when said click stop member is urged against said second circumferential surface.

17. An enlarging lens barrel as set forth in claim 7, wherein said barrel further comprises:

a cover provided on said inner barrel;

a colored, light transmissive, click stop release indicating ring, and mounted on the end portion of said indicating ring in an axial direction of said inner sleeve, said click stop release indicating ring being masked by said cover, when said click stop member is urged against said first circumferential surface and being unmasked by said cover and appearing in front of said opening, when said click stop member is urged against said second circumferential surface.

18. An enlarging lens barrel as set forth in claim 1, wherein the overall length of said reflecting surface along the longitudinal direction of said guide passageway is greater than the width of said guide passageway.

* * * * *